UNITED STATES PATENT OFFICE.

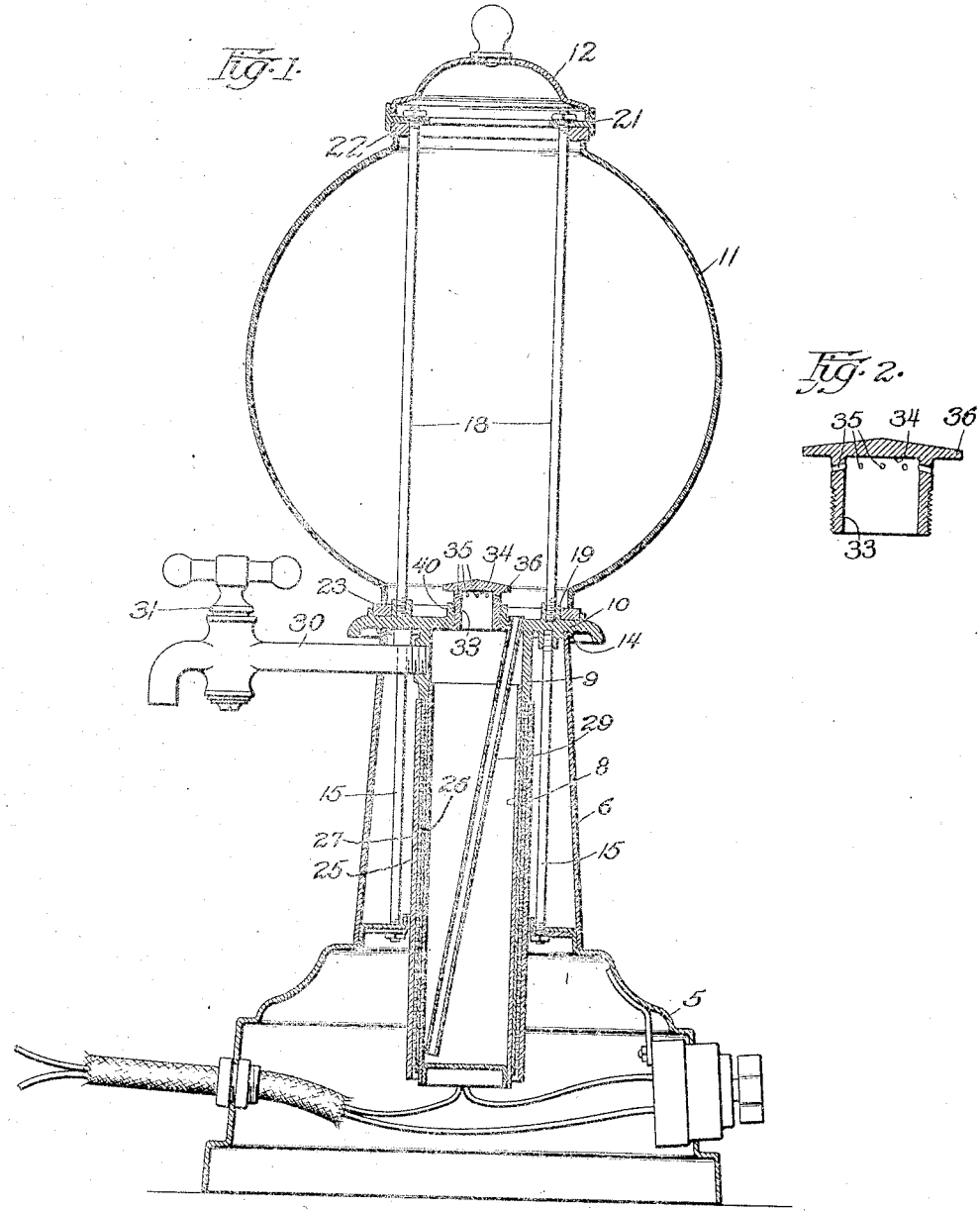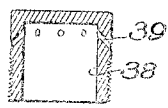

HENRY E. BANDLOW, OF CHICAGO, ILLINOIS.

LIQUID-HEATER.

981,155.

Specification of Letters Patent. Patented Jan. 10, 1911.

Application filed October 3, 1910. Serial No. 584,968.

*To all whom it may concern:*

Be it known that I, HENRY E. BANDLOW, a citizen of the United States, and a resident of Chicago, in the county of Cook and State of Illinois, have invented certain new and useful Improvements in Liquid-Heaters; and I do hereby declare that the following is a full, clear, and exact description thereof, reference being had to the accompanying drawings, and to the characters of reference marked thereon, which form a part of this specification.

This invention relates to improvements in quick or instantaneous liquid heaters and refers more particularly to that type of heaters which embrace a liquid heating vessel with means to heat the same and a superposed reservoir to supply liquid to the heating vessel in such manner as to avoid circulation of heated liquid back to the reservoir when liquid is being withdrawn from the heating vessel while permitting steam to be vented from said vessel to the reservoir.

The object of the invention is to improve and simplify the arrangement of the liquid circulating devices for the purpose set forth and the invention consists in the matters hereinafter set forth and more particularly pointed out in the appended claims.

In the drawings,—Figure 1 is an axial vertical section of a heater embodying my invention. Fig. 2 is an enlarged axial section of the plug 33 shown in Fig. 1. Fig. 3 is a section similar to Fig. 2 showing a modification.

The casing of the heater comprises the sheet metal base 5 and the tubular upright portion 6. Within said casing is supported a vertical heating vessel 8, said heating vessel for the liquid comprising a sheet metal tube closed at its bottom and extending upwardly into the lower end of a tubular extension of the cast metal top piece 10, which constitutes in part a portion of the top wall of the casing and in part the top wall of the heating chamber vessel. The said cast metal top piece 10 constitutes the support for a liquid reservoir 11 usually made of glass which is located above the heating vesesl and is provided at its top with a removable cap piece 12 which normally closes the filling opening of the reservoir.

The upper margin of the upright casing member 6 fits within an annular slot formed in a thickened part or enlargement 14 on the bottom of the casting 10 and said upright member of the casing is clamped between the base and said cast top piece, and the base is attached to the latter through the medium of the rods 15 in the manner shown in Fig. 1. The reservoir is likewise held in place on the casting 10 by means of rods 18 which extend between and are attached at their ends to the casting 10 and to a clamping ring 21 fitted to the upper open side of the reservoir. The seat for the cap 12 is formed in said clamping ring 21. Compressible washers 22, 23 are interposed between the edges of said reservoir and said clamping ring and the casting 10, respectively, to protect said edges from breakage.

The tubular heating vessel 8 is surrounded by an electrical heating coil 25 which may be connected in any preferred manner with a supply circuit and with a switch. The said coil is preferably wound about a thin insulating layer 26 of mica or the like, which immediately surrounds the heating vessel. The coil is preferably in turn inclosed by a heat insulating sheath 27, of asbestos or the like, to protect the casing from the heat of the heating coil.

The liquid passes from the reservoir to the bottom of the heating vessel through a pipe 29 which extends at its upper end through an opening in the casting 10 (which constitutes the bottom wall of the reservoir and the top wall of the heating vessel) and extends at its lower end to the bottom of said vessel. Liquid is drawn off from the upper end of the heating vessel 8 through a draw-off pipe 30 provided with a faucet 31, the inner end of said draw-off pipe engaging a screw-threaded opening in a thickened portion of the tubular extension 9 of the top casting 10.

The present invention, constituting a part of the heater described, relates to an improved means for controlling the circulation of the liquid being heated in such manner as to quickly heat the liquid within the heating vessel or tube 8 and avoiding the necessity of heating the entire body of liquid contained in the reservoir, while at the same time providing means for the escape of vapor or steam from the top of the heating vessel to the reservoir in the event that the liquid is raised to the vaporizing or steam temperature.

In order to provide for such circulation as will heat the liquid in the heating vessel without correspondingly heating the liquid in the reservoir, and at the same time provide a vent for steam from the heating chamber to the reservoir, I have provided the top wall 10 of the heating vessel with an opening in which is fitted a hollow plug 33, said plug being in open communication at its lower end with the heating vessel and closed at its upper end by the end wall 34. The said hollow plug communicates with the reservoir through the medium of a plurality of small, constantly open, apertures 35 arranged in the vertical wall of the plug and disposed circularly about said wall. In order that steam escaping or venting through said apertures shall not be given a direct upward direction in a manner to escape directly upwardly through the body of liquid in the reservoir, I may provide the hollow plug above said vent apertures with an annular flange 36 which overhangs said apertures so as to give the steam, when first issuing from the apertures, a lateral direction through the fluid. Said apertures 35 will preferably be given a slightly downward and outward inclination.

In Fig. 3 I have shown a form of hollow plug 38 in which the flange of the first described plug is omitted, and the vent apertures 39 thereof are inclined sharply downwardly and outwardly so as to give the steam which is vented therethrough a sharp downward inclination such as will prevent the direct rise of the steam through the liquid in the reservoir as soon as it escapes through the apertures, but will cause the steam to first tend downwardly and more slowly upwardly when its velocity is reduced. By thus giving the steam a lateral or downward tendency as it issues from the apertured plug, there is less tendency of disturbing the liquid above the plug.

In operation, when it is desired to draw heated liquid from the heater the current is switched into the heating coil and the heat generated in the coil acts to quickly heat the liquid in the vessel 8. When the liquid has been raised to the proper temperature, requiring but a few seconds, the faucet 31 is opened to allow the liquid to flow from the heating vessel under the head of the column of liquid in the reservoir; the liquid passing from the reservoir through the tube 29 into the heating vessel to replace the liquid drawn from said vessel. The total area of the vent apertures 35 is so related to the area of the discharge or draw-off pipe 30 that, when the draw-off pipe is open, the heated liquid will pass out of the heating vessel through the open draw-off pipe and no substantial volume of liquid will rise upwardly into the reservoir. In other words the vent apertures 35, while providing for escape or vent of steam from the heating vessel to the reservoir at times when the draw-off pipe is closed, constricts the flow of liquid so that little or no liquid passes to the reservoir when the draw-off pipe is open. The liquid that passes from the reservoir to the lower end of the heating vessel, at a time when the draw-off pipe is open, is heated by the time it reaches the draw-off pipe. Thus it will be seen that the body of liquid in the reservoir constitutes a supply for the heating vessel, and that when the draw-off pipe is opened to draw heated liquid from the heater, the heat of the coil or other heating device is applied only to that part of the liquid in the heating vessel, the constantly open restricted apertures preventing the heated liquid rising in substantial quantities into the reservoir. The heat applied to the liquid is not, therefore, unnecessarily expended in the body of liquid in the reservoir, such as would occur if there were a free unrestricted flow of liquid from the heating vessel to the reservoir. If however the temperature of the liquid in the heating vessel shall rise to the steam point at a time when the draw-off pipe is closed, the steam will be vented through the small apertures 35 and thereby avoid dangerous pressure in the heating vessel. Moreover said vent apertures 35 avoid such pressure in the top of the heating vessel as will tend to depress the liquid level in said vessel below the draw-off pipe, so that as soon as the draw-off pipe is opened heated liquid begins at once to flow therethrough, without a preliminary discharge of steam or vapor from the draw-off pipe.

The said hollow plug 33 or 38 may be fixed in the opening in the top wall of the heating vessel in any suitable manner. As herein shown said top wall is provided with a screw-threaded boss 40 and the plug is screw-threaded to enter the same. The removability of the plug provides means whereby the heating vessel may be readily cleaned, inasmuch as free access may be had to said vessel when the reservoir and the hollow plug have been removed from place.

It will be manifest that the structural details of the heater may be somewhat varied from that herein shown and it will also be obvious that heat may be applied to heat the liquid in the heating vessel by other means than herein shown. The invention is therefore not limited to the illustrated details, except as such details are hereinafter specifically claimed.

I claim as my invention:—

1. A liquid heater comprising a heating vessel having means for heating the same and provided at its upper end with a draw-off device, a reservoir over said heating vessel, and means for directing liquid from the reservoir to the bottom of said vessel, there being a constantly open passage between the upper end of the heater and the reservoir of such area relatively to the draw-off pipe as to prevent substantial circulation of heated water from the heating vessel to the reservoir when liquid is being drawn off through said pipe, while permitting the escape of the steam therethrough from the receptacle to the reservoir.

2. A liquid heater comprising a heating vessel having means for heating the same and provided at its upper end with a draw-off pipe, a reservoir over said heating vessel, means for directing liquid from the reservoir to the lower end of the heating vessel, and a tubular member in open communication with the heating vessel and closed at its top and provided in its side walls with a plurality of small, constantly open vent openings affording passage for steam therethrough from the heating vessel to the reservoir, while preventing the passage of a substantial volume of heated liquid from said vessel to the reservoir when the draw-off pipe is open.

3. A liquid heater comprising a heating vessel having means for heating the same and provided at its upper end with a draw-off pipe, a reservoir over said heating vessel, means for directing liquid from the reservoir to the lower end of the heating vessel, and a tubular member in open communication with the heating vessel and closed at its top and provided with a circular series of small, constantly open vent openings affording passage for steam therethrough from the heating vessel to the reservoir, while preventing substantial escape of heated liquid from said vessel to the reservoir, with means to direct the steam laterally from said openings to prevent it rising directly from said openings upwardly through the reservoir.

4. A liquid heater comprising a heating vessel having means for heating the same and provided at its upper end with a draw-off pipe, a reservoir over said heating vessel, means for directing liquid from the reservoir to the lower end of the heating vessel, and a tubular member in open communication with the heating vessel and provided with a plurality of downwardly inclined small vent openings affording passage for steam therethrough from the heating vessel to the reservoir, while preventing the escape of heated liquid from said vessel to the reservoir when the draw-off pipe is open.

5. A liquid heater comprising a heating vessel having means for heating the same and provided at its upper end with a draw-off pipe, a reservoir over said heating vessel, means for directing liquid from the reservoir to the lower end of the heating vessel, and a vertical tubular member in open communication with the heating vessel and closed at its top and provided below its top with a circular series of small openings, there being a flange at the top of said member which overhangs said openings, for the purpose set forth.

6. A liquid heater comprising a heating vessel having an electrical heating coil surrounding the same, a reservoir over said heating vessel, means for directing liquid from the reservoir to the lower side of the heating vessel, and a draw-off device at the upper end of the vessel, there being a plurality of small, constantly open vent openings affording passage for steam from the heating vessel to the reservoir, but preventing the flow of heated liquid in substantial quantities from said vessel to said reservoir when the draw-off device is open.

7. A liquid heater comprising a heating vessel having means for heating the same, a reservoir above said vessel, means for directing liquid from the reservoir to the bottom of said vessel, a draw-off device at the top of the vessel, and a hollow plug removably fitted in the top wall of said vessel in open communication with said vessel and closed at its top, the wall of said plug being provided with a plurality of small openings affording passage of steam from said vessel to the reservoir but preventing passage of heated liquid in substantial quantities from said vessel to the reservoir when the draw-off device is open.

In testimony, that I claim the foregoing as my invention I affix my signature in the presence of two witnesses, this 1st day of October A. D. 1910.

HENRY E. BANDLOW.

Witnesses:
W. L. HALL,
WILLIAM GOLDBERGER.